No. 730,336. PATENTED JUNE 9, 1903.
A. BENNETT.
BOX FASTENER.
APPLICATION FILED JUNE 24, 1902.
NO MODEL.
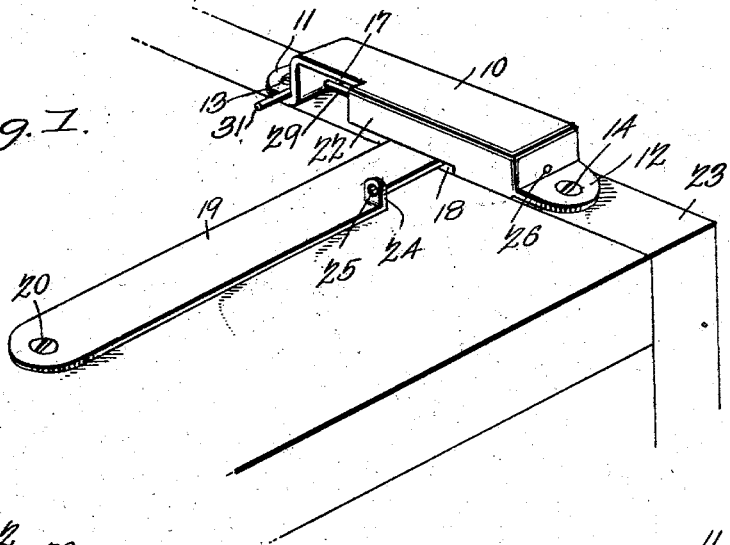
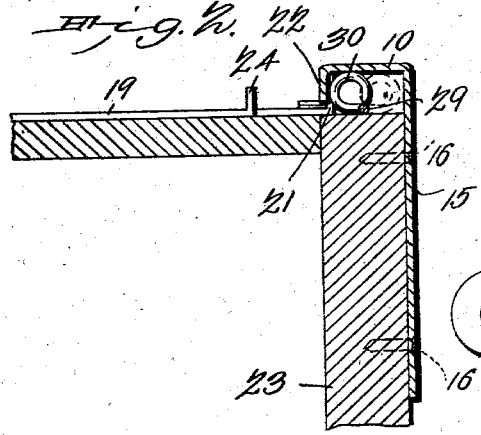
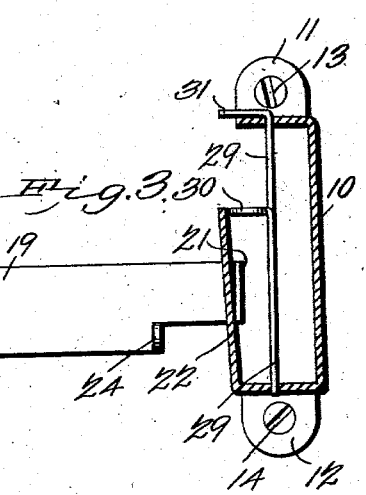
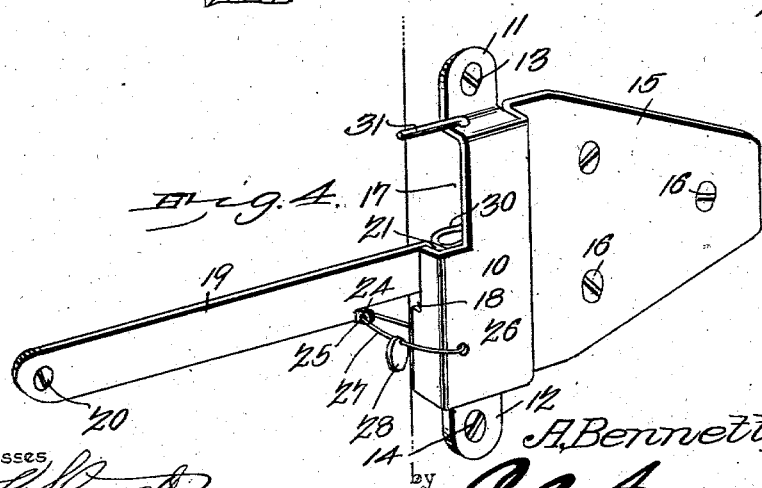
Witnesses
A. Bennett, Inventor.
Attorneys No. 730,336. Patented June 9, 1903.

UNITED STATES PATENT OFFICE.

ALBERT BENNETT, OF PUYALLUP, WASHINGTON, ASSIGNOR OF ONE-HALF TO JOHN MUGFORD, OF PUYALLUP, WASHINGTON.

BOX-FASTENER.

SPECIFICATION forming part of Letters Patent No. 730,336, dated June 9, 1903.

Application filed June 24, 1902. Serial No. 112,988. (No model.)

*To all whom it may concern:*

Be it known that I, ALBERT BENNETT, a citizen of the United States, residing at Puyallup, in the county of Pierce and State of Washington, have invented a new and useful Box-Fastener, of which the following is a specification.

This invention relates to devices employed for the purpose of detachably securing covers to boxes and which may also be employed for securing doors and many other forms of closures; and the object of the invention is to produce a simple, inexpensive, and easily operated and applied device which will not contain projections in danger of being broken off or displaced.

The invention consists in certain novel features of construction, as hereinafter shown and described, and specified in the claims.

In the drawings illustrative of the invention, Figure 1 represents a perspective view of the invention applied. Fig. 2 is a sectional elevation of the device constructed as in Fig. 1. Fig. 3 is a top plan view of the device with the casing shown in horizontal section. Fig. 4 is a perspective view of the device, illustrating a modification of the construction.

The device comprises a lock-casing 10, having means for attachment to the box or other closure to which it is to be applied. Preferably the casing, together with its means of attachment, will be "struck up" from a single piece of sheet-steel and will be formed with ears 11 12 at the ends, suitably perforated to receive the holding-screws 13 14, and with an extension 15, also suitably perforated to receive holding-screws 16. The casing and its attachments may be of any suitable size to adapt it to the size or form of the closure to which it is to be attached.

The casing 10 will be formed with a cavity in one side at the top, this cavity being indicated at 17, and leading from this cavity is a recess 18, formed in the inner edge of the side of the casing next the body to which the casing is attached.

The hasp or "bolt" is shown at 19 and consists of a bar pivotally supported upon the other part of the closure, as by a screw 20, and provided at its free end with a turned-off end 21, the turned-off end adapted to enter the cavity 17 and pass downward into the casing 10 behind its side edge, while the shank of the hasp 19, adjacent to the turned-off end 21, enters the recess 18, as indicated in Fig. 1.

It will be noted that the side wall 22 is inclined outwardly from the casing, whereby the interior of the casing at one side inclines inwardly from the inner end of the cavity 17 to the inner end of the recess 18, so that the turned-off end 21 will move downward within the casing at an incline, whereby provision is made for "drawing" the casing toward the pivotal point 20 of the hasp, and thus correspondingly "draw" the two parts which are united by the device strongly toward each other. This is an important feature of the invention and adds materially to its value and efficiency, as it insures a tight joint between the parts and effects a closing of any slight gaps which might otherwise occur between them.

The hasp 19 is pivoted to swing in substantial alinement with the bottom of the casing 10, so that in its swinging motion the turned-off portion 21 will freely enter the cavity 17 and pass behind the body portion of the casing when the hasp is actuated, and thus form a catch mechanism between the two parts of the box or a door and its casing and exert a drawing force upon the inclined side, as above noted.

The casing 10 is here shown attached to a box, as indicated at 23, with the recess 18 next to the part 23, to which the casing is attached, so that said recess 18 will be in the form of a contracted slit, and the body portion of the hasp 19 will fill this recess when the device is in position to avoid undue lateral looseness or rattling.

The hasp 19 will be provided with a projection 24, having a perforation 25, and the casing 10 will be provided with a corresponding perforation 26, preferably opposite the lower portion of the recess 18, to provide for the insertion of a sealing-wire, the latter indicated at 27 and provided with a conventional "seal" 28. These sealing-wires and seals are of various forms, with the "wire" either round or flat, and the present device is easily adapted to the use of either form of wire by making the perforations 25 26 of the proper shape.

By this simple means the lock after being engaged may be easily secured by the usual breakable seal without adding to the expense of the lock or increasing its complication or weight.

Revolubly supported within the casing 10 is a bolt 29, having a lateral projection 30 thereon in substantial alinement with the inner part of the cavity 17 and provided with an exterior operating-handle 31. The operating-handle 31 provides means for the rotation of the bolt 29 to cause the projection 30 to be thrown inward against the rear side of the casing, as indicated in dotted lines in Fig. 2, to leave the way clear for the insertion of the part 21 of the hasp, and then when the hasp has been entered by reversing the handle 31 the projection 30 will be thrown over to close the entrance to the recess 18 and prevent the removal of the hasp. By this simple means the bolt 29, with its projection 30 and handle 31, becomes a means for locking the hasp into connection with the casing 10, as will be readily understood.

The bolt 29 may be formed in any suitable manner, but will preferably be of a section of wire of sufficient strength to resist the strains to which it will be subjected, and bent to shape, the projection 30 being formed by turning a loop in the bolt at the proper point transversely to its axis. This makes a very simple, cheap, and effective bolt, easily replaced when broken, and which can be made of ample strength to resist the strains to which it will be subjected when in action.

The whole device may thus be constructed in three pieces—the casing 10, with its attachments 11 12 15, the hasp 19, and the bolt 29, with its projection 30.

It will be noted that the casing 10 is comparatively flat and projects only a short distance beyond the surface 23, to which it is attached, and no part of the device projects beyond this flat casing when the device is in action, so that there are no projecting knobs or other parts liable to be broken off when in use or in transit. This is an important feature of the invention and adds materially to the value of the device by greatly increasing its durability and security.

The casing 10 and its attachments, as before stated, may be formed in any size or suitable material to adapt it to the various purposes for which it is to be employed.

In Fig. 2 the extension 15 is shown arranged in alinement with the rear side of the casing 10, which will be the form of construction employed when the device is attached to a box or similar receptacle, and in Fig. 4 the portion 15 is shown in alinement with the bottom of the casing 10, which will be the construction employed when the device is used upon doors and similar closures.

Having thus described my invention, what I claim is—

1. In a device of the class described, a casing, a hasp, the free end of which is adapted to enter said casing, and a bolt composed of a single piece of wire rotatably secured in said casing and provided with a looped offset adapted to be projected across the path of the hasp when the bolt is rotated.

2. In a device of the character described, a casing having a cavity at one end and a contracted recess leading from said cavity, a hasp movably attached to the closure to be secured, and provided with a projection adapted to enter said cavity and engage the adjacent side wall of the casing, and a bolt of a single piece of wire rotatably secured in said casing and provided with an offset formed by turning a loop transversely in the bolt, whereby when said bolt is rotated, said loop will be projected across the path of the hasp, substantially as described.

In testimony that I claim the foregoing as my own I have hereto affixed my signature in the presence of two witnesses.

ALBERT BENNETT.

Witnesses:
 ERIC P. TRUEDSON,
 GEO. D. SPURR.